United States Patent [19]

Allen et al.

[11] 4,178,404

[45] Dec. 11, 1979

[54] IMMERSED RETICLE

[75] Inventors: Edwin M. Allen; William C. Fitzgerald; Henry Blazek; George Turner, all of Ridgecrest, Calif.

[73] Assignee: The United States of America as represented by the Secretary of the Navy, Washington, D.C.

[21] Appl. No.: 875,062

[22] Filed: Feb. 6, 1978

[51] Int. Cl.² ............... B32B 15/04; B05D 5/06; G02B 1/10

[52] U.S. Cl. .................. 428/209; 33/297; 156/630; 350/164; 427/164; 427/205; 427/264; 427/294; 428/332; 428/336

[58] Field of Search .......... 428/209, 422, 332, 336; 33/297; 156/630, 3; 350/164; 427/264, 294, 164, 205

[56] References Cited

U.S. PATENT DOCUMENTS

| 121,009 | 11/1871 | Schurr et al. | 428/422 |
|---|---|---|---|
| 2,932,599 | 4/1960 | Dahlgren | 156/630 |
| 2,964,436 | 12/1960 | Mikulis et al. | 156/630 |
| 3,107,197 | 10/1963 | Stein et al. | 428/422 |
| 3,215,574 | 11/1965 | Korb | 156/3 |
| 3,694,945 | 10/1972 | Detiker | 428/209 |
| 3,999,301 | 12/1976 | Hunt et al. | 33/297 |

*Primary Examiner*—Thomas J. Herbert, Jr.
*Attorney, Agent, or Firm*—R. S. Sciascia; W. Thom Skeer; D. Kalmbaugh

[57] ABSTRACT

A low reflectance reticle immersed in optical cement between transparent substrates. A copper reticle is vacuum deposited upon one transparent substrate and chemically treated to produce anti-reflectance properties. The reticle and substrate to which it is attached are then cemented with optical cement to a second transparent substrate to immerse the anti-reflectance reticle between tranparent substrates in optical cement. The immersed reticle thus formed has superior anti-reflection properties and is protected from mechanical damage by its immersed location. Immersed reticles may be installed between elements of a compound lens if desired.

3 Claims, 7 Drawing Figures

IMMERSED RETICLE

BACKGROUND OF THE INVENTION

1. Field of the Invention

The present invention pertains to optical reticles, and more particularly to optical reticles having superior anti-reflection properties.

2. Description of the Prior Art

Prior compound optical elements have located the reticle on an exposed exterior surface of the lens. Such reticle is vulnerable to degradation by mechanical abrasion. Anti-reflectance reticles heretofore have comprised thin metallic layers deposited upon a transparent substrate, formed in a reticle configuration, and chemically treated to produce a roughened surface. This roughened surface reflects and diffuses incident light so that specular reflections do not result.

Such prior art reticles merely change specular reflections to diffuse reflections and are themselves easily damaged by mechanical abrasion because of the exposed positions such reticles normally occupy.

SUMMARY OF THE INVENTION

The present invention overcomes many of the deficiencies of prior art reticles by producing a reticle which greatly reduces or eliminates any reflections, either specular or diffuse, while also being protected between elements of a compound lens or other optical structure. A thin layer of titanium is vacuum sputter deposited on a transparent optical substrate. A layer of copper is then vacuum sputter deposited over the titanium. A reticle pattern is then etched in the metallic layers using photolithographic techniques. Finally the copper is blackened in a solution which reduces the copper to copper oxide having a fine feathery dendritic type structure and needle structures up to 0.2 micron diameter and up to 5 micron length. The substrate and reticle is then cemented to a second substrate, immersing the delicate reticle in optical cement between the two substrates and thereby protecting it from mechanical abrasion.

BRIEF DESCRIPTION OF THE DRAWING

Further advantages of the present invention will emerge from the discription which follows of the preferred embodiment of an immersed reticle according to the invention, given with reference to the accompanying drawings Figs., in which.

DESCRIPTION OF THE PREFERRED EMBODIMENT

Figure 1:
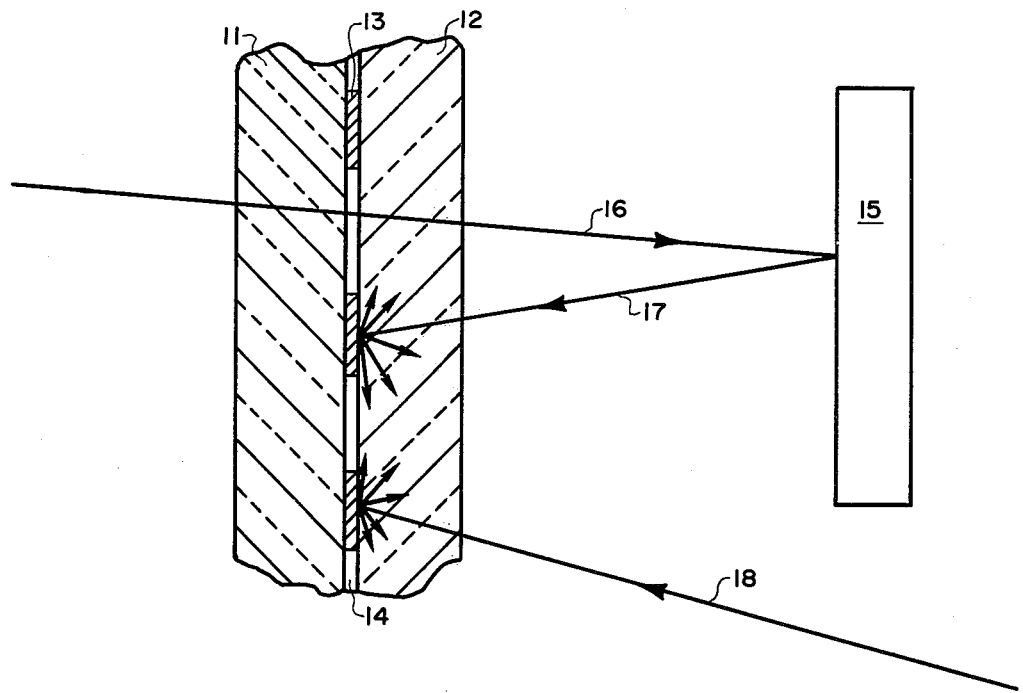
FIG. 1 illustrates an immersed reticle within an optical seeker.

Referring now to the drawing, wherein like reference characters refer to like parts and elements throughout the several views, there is shown in FIG. 1 an immersed reticle 13 sandwiched between a first transparent substrate 11 and a second transparent substrate 12. A light ray 16 passes through substrates 11 and 12, between opaque portions of reticle 13, and strikes a detector 15. A portion of ray 16 is reflected by detector 15 and is shown as a ray 17. Ray 17 strikes the backside of antireflectant reticle 13 and is diffused and absorbed by a copper oxide surface on reticle 13. Similarly, a spurious ray 18 strikes the opaque portion of reticle 13 and is diffused and absorbed.

Reticle 13 is immersed between substrates 11 and 12 by an optical cement 14 which also serves to bind substrate 11 adhesively to substrate 12.

Figure 2:
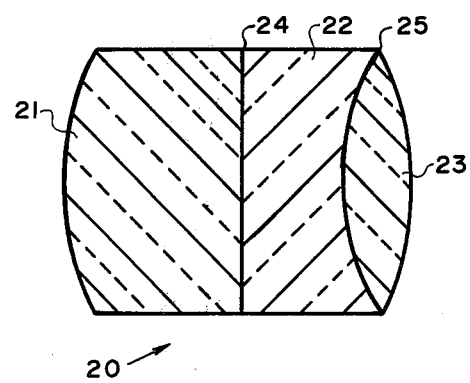
FIG. 2 illustrates a compound lens having an immersed reticle.

Referring now to FIG. 2 there is shown compound a lens 20 having a first element 21, a second element 22, and a third element 23. An interface 24 between first element 21 and second element 22 may serve as the location for an immersed reticle. An interface 25, between element 22 and element 23, may also be suitable provided a close fit is achieved between adjacent curved surfaces.

As is well known in the optical arts, the cleanliness of optical components which are to be attached to each other is of primary importance. Accordingly, extreme care must be taken in preparing immersed reticles according to the present invention to insure that particles of dirt or other foreign matter are not included between surfaces which closely fit, and that no contamination is included during the reticle sputtering process which may degrade performance of the completed reticle.

To fabricate an immersed anti-reflectance reticle according to the present invention it is first necessary to clean thoroughly an optical substrate, which may be spinel or other material. Sequential washing in solvents such as benyene or toluene, trichloroethylene, acetone, methyl alcohol, and finally soap and deionized water followed by nitrogen gas blow dry should produce a clean substrate. Other cleaning procedures may be used, and the degree of cleanliness required is determined by the level of quality needed for the finished product.

Clean substrates and targets are then loaded into a vacuum sputter deposition system. The targets are presputtered and the substrates sputter-etched for at least two minutes. Without breaking the vacuum, a titanium layer, 500 plus or minus 100 angstrom units thick, is sputter deposited on the substrates. Again, without breaking vacuum, a copper layer, 40,000 plus or minus 1000 angstrom units thick, is sputter deposited over the titanium layer. Substrate temperature should not exceed 400° C. during deposition. After the substrates have cooled to room temperature, they should be removed from the vacuum system and inspected for layer thickness and quality. The surface structure of the copper film should be such that the protuberances do not exceed 0.5 microns in diameter.

A reticle pattern is then etched through the copper and titanium films using, for example, high resolution photolithography and suitable etchants as is well known in the art. Edge resolution of 0.1 mil (2.54 microns) is to be maintained. Ferric chloride solution may be used to etch the copper layer.

At this point, anti-reflectance coatings may be applied to the spinel surfaces if desired, and protective layers applied over the anti-reflectance coatings. Reduction of the copper to black copper oxide may be performed using chemicals such as Ebonal C, a sodium hydroxide and sodium chlorite product of Enthone, Inc., New Haven, Conn., or by any equivalent chemical or electrochemical means.

The reticle and substrate is then immersed in a heated chemical bath and the exposed copper portion chemically reduced to copper oxide having fine feathery dendritic clusters and needle structures of up to 0.2 micron diameter and 5 micron length. If desired, a thinner copper layer, approximately 20,000 plus or minus 1,000 angstrom units thick, may be used. Substrates other than spinel, such as sapphire, may be used.

The black reticle surface is not to be touched during assembly of the completed compound optical element as this will destroy the low reflectance properties of the rough copper oxide surface. No post-preservative treatments of any type should be attempted on oxide surface 13. A second transparent substrate is then carefully cemented to the reticle and surface of the first transparent substrate in a well known manner. Lens holding fixtures may be used and commercial optical cement may be used as well. Of course, as previously stated the utmost care must be taken to prevent contamination of the elements before they are assembled to insure secure bonds between elements and to prevent voids or scratches which may interfere with optical transmission.

Figure 3:
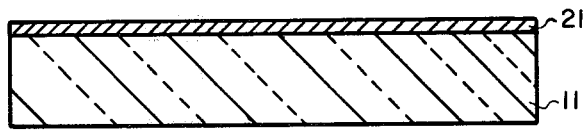
FIGS. 3 thru 7 illustrate the process steps necessary to produce an immersed reticle according to the invention.
Figure 4:
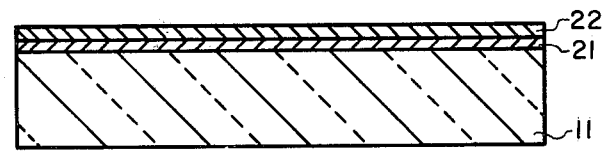
Figure 5:
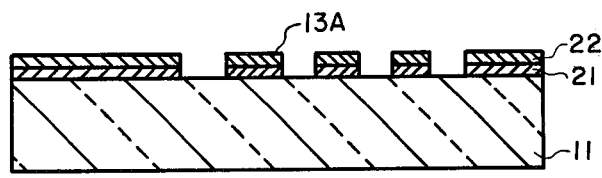
Figure 6:
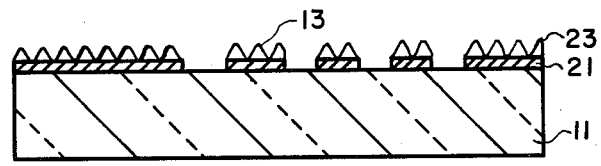
Figure 7:
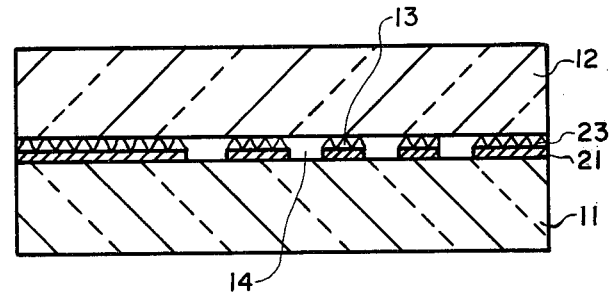

FIGS. 3 thru 7 illustrate the preferred process steps to be followed, in which FIG. 3 shows substrate 11 having a sputter coated first layer binder 21 which may be titanium. FIG. 4 shows a second sputter deposited metallic layer 22 deposited after first layer 21 without cycling the sputtering apparatus to atmosphere. Layer 22 may be copper. FIG. 5 shows layers 21 and 22 after etching to produce a reticle pattern 13 A. Conventional photolithographic etching techniques may be used. FIG. 6 shows reticle 13 after layer 22 has been chemically treated to form black oxide layer 23. FIG. 7 shows the final assembly of substrate 12 to substrate 11 with optical cement 14 which fills voids in the reticle pattern and immerses the reticle without degrading the antireflectance properties of oxide layer 23. This construction protects layer 23 from degradation and damage from mechanical abrasion, and enables more flexible design of reticle placement within an optics system to achieve predetermined optical effects.

Obviously, many modifications and variations of the present invention are possible in the light of the above teachings. It is therefore to be understood that within the scope of the appended claims the invention may be practiced otherwise than as specifically described.

What is claimed is:
1. A metallic reticle, comprising:
   a transparent optical substrate;
   a layer of titanium attached to said transparent optical substrate;
   a layer of copper attached to said layer of titanium, said layer of copper having an oxidized surface characterized by fine feathery dendritic clusters.
2. A metallic reticle according to claim 1 wherein said fine feathery dendritic clusters have diameters of up to 0.2 microns, and lengths up to 5 microns.
3. A compound optical element according to claim 1 wherein said transparent optical substrate comprises an element of a compound lens.

* * * * *